United States Patent [19]

Cashman

[11] 4,326,367
[45] Apr. 27, 1982

[54] RACING SULKY AND HARNESS

[75] Inventor: Richard J. Cashman, Columbus, Ohio

[73] Assignee: Produce Processors International Corporation, Columbus, Ohio

[21] Appl. No.: 164,138

[22] Filed: Jun. 30, 1980

[51] Int. Cl.³ .............................. B62C 1/08; B68B 3/00
[52] U.S. Cl. ............................................. 54/2; 54/51; 280/63
[58] Field of Search ...................... 54/2, 23, 39, 40, 51, 54/51, 54; 280/63-77

[56] References Cited

U.S. PATENT DOCUMENTS

| | | | |
|---|---|---|---|
| 330,426 | 11/1885 | Rohrer et al. | 54/51 |
| 521,460 | 6/1894 | Elliott | 280/63 |
| 555,630 | 3/1896 | Whitacre | 54/51 |
| 3,907,325 | 9/1975 | Gaines et al. | 280/63 |
| 4,072,000 | 2/1978 | Clemens | 54/2 |

*Primary Examiner*—Hugh R. Chamblee
*Attorney, Agent, or Firm*—Frank H. Foster

[57] ABSTRACT

An improved sulky and harness is disclosed. The improvement includes a pair of ball joints joining the shafts of the sulky to the harness of the horse. The ball joints avoid unnecessary restraint upon the running horse by allowing only pulling forces to be applied through the shafts to the sulky. The driver's seat is positioned up higher than the conventional sulky and forward of the wheel axles to reduce or eliminate the upward lift of the shafts during acceleration at the start of a race.

2 Claims, 7 Drawing Figures

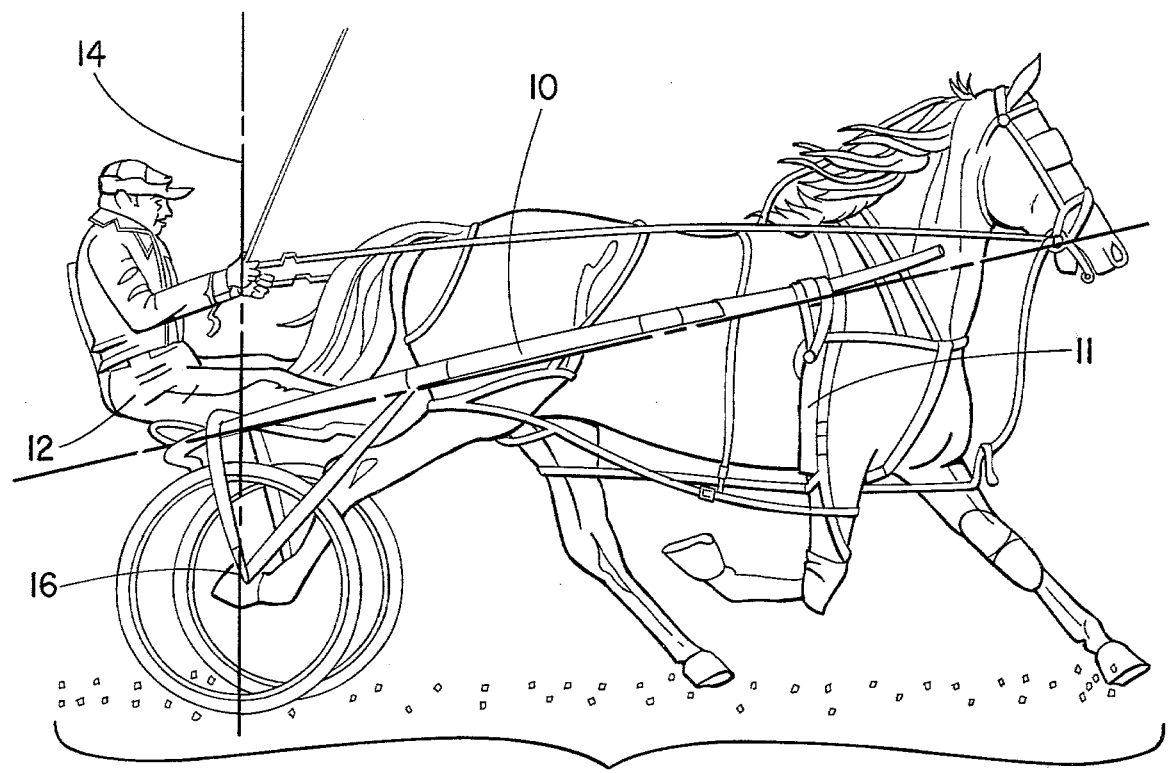
PRIOR ART Fig. 1
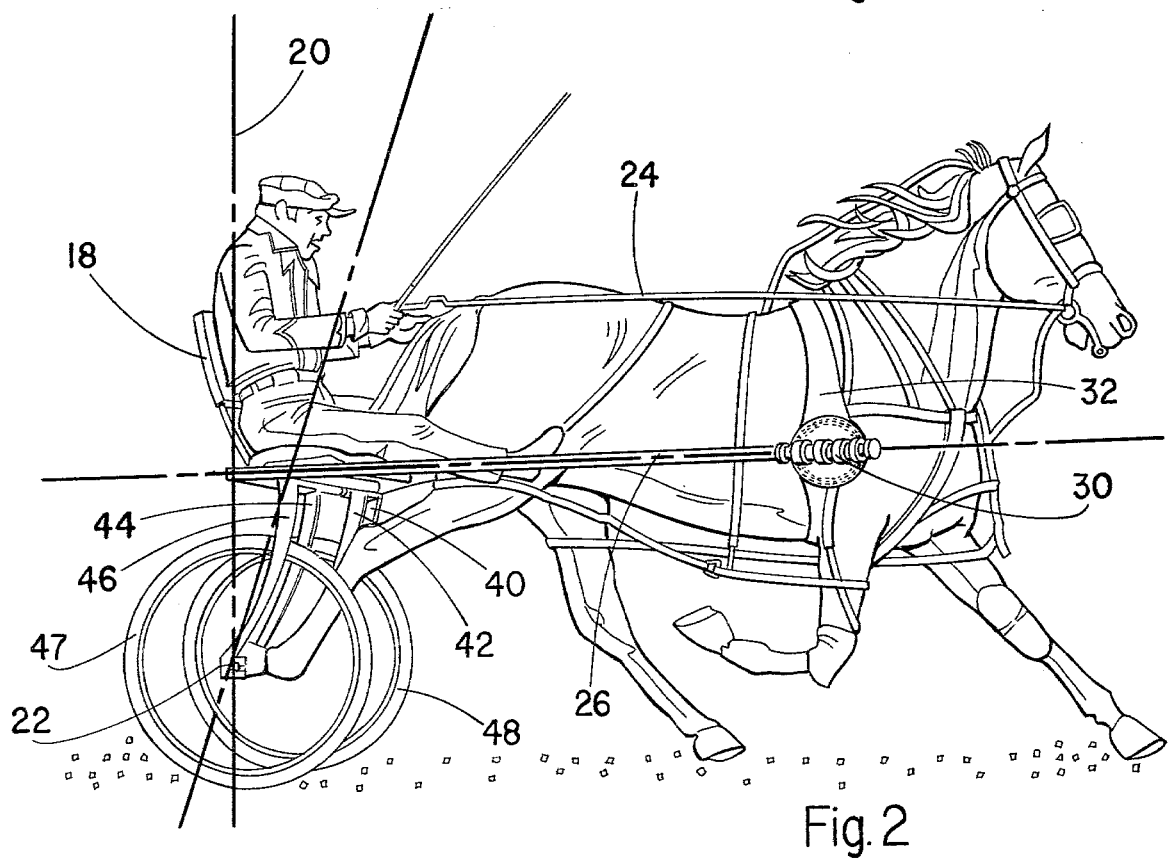
Fig. 2

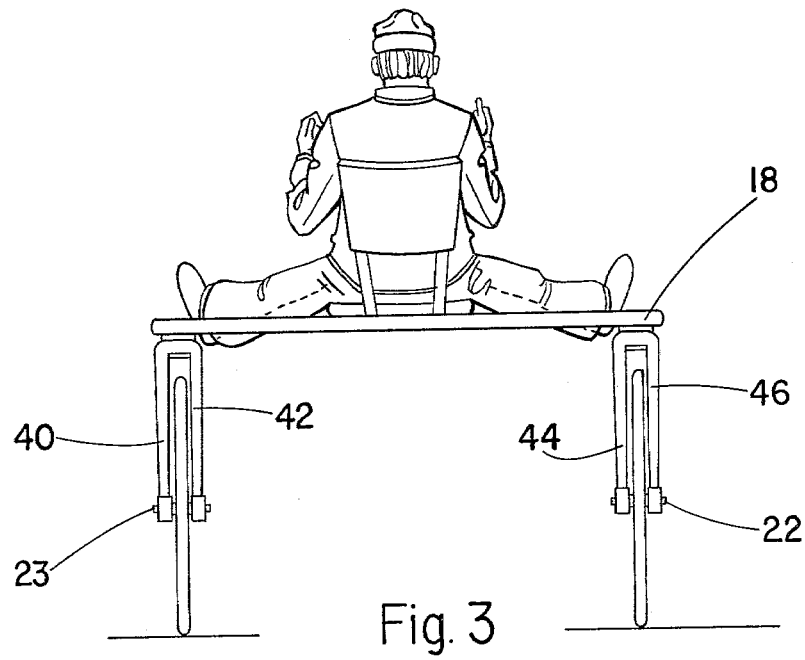
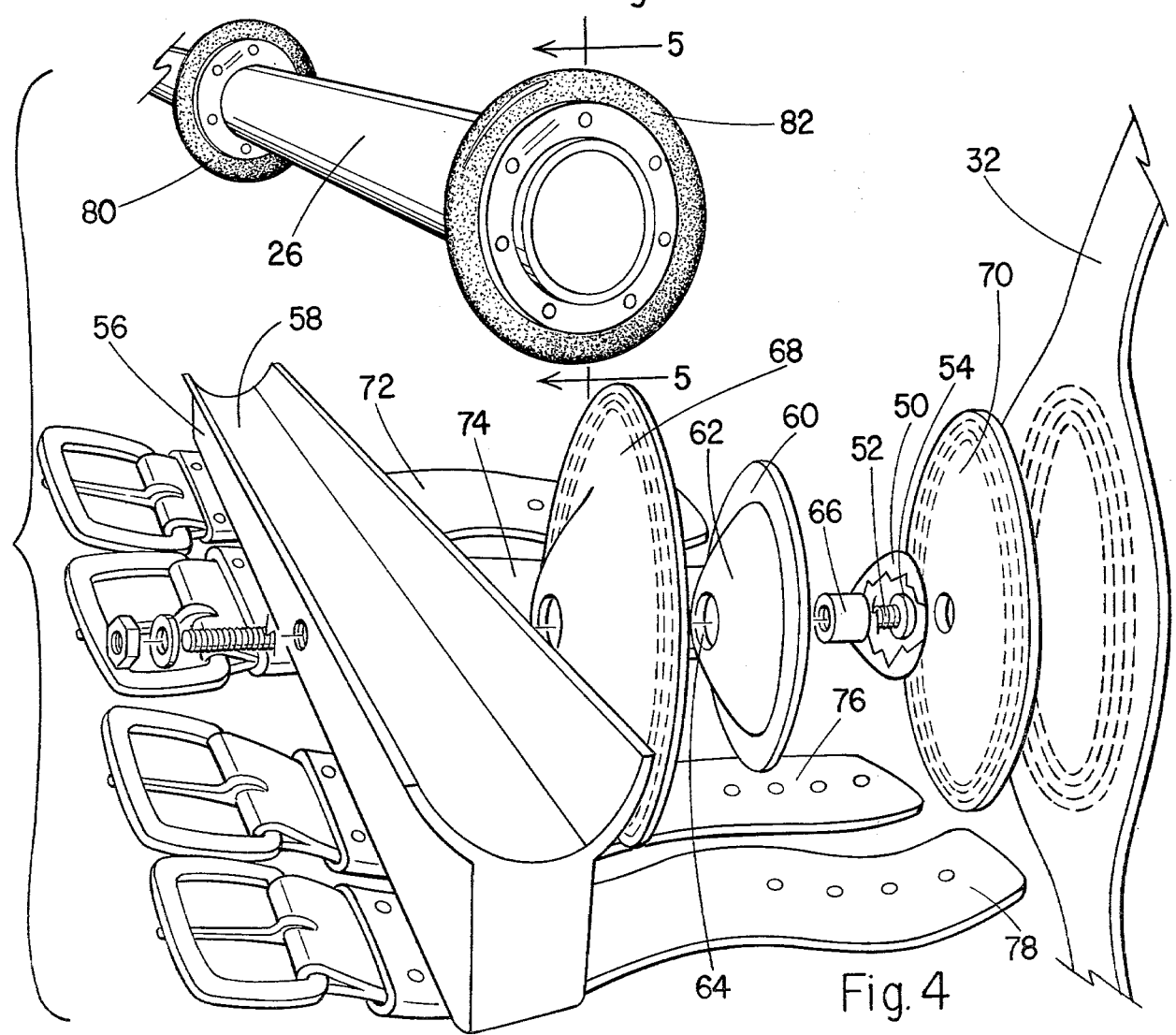

RACING SULKY AND HARNESS

TECHNICAL FIELD

This invention relates to tack and carts for horses and more particularly relates to an improved sulky and harness construction for harness racing.

BACKGROUND ART

The harness and cart equipment used with modern trotters and pacers have developed historically from the era when horses provided the primary means for transportation of people and goods. The harness itself was developed from harnesses which were used for pulling carriages.

Race conditions make different demands upon the horse and the equipment than do conventional carriage driving conditions. For example, a horse following a starting gate may be travelling at approximately one-third its potential speed. When the gate is pulled forward at the start, the race horse works hard to increase its speed. The horse reaches out further with its hooves as it attempts to accelerate. This acceleration often causes undesirable consequences.

As the horse accelerates, the driver's weight is thrown backward because of the driver's inertia. As shown in FIG. 1, the center of gravity of the driver of a conventional sulky is positioned rearwardly of the wheel axles of the sulky. Thus, the inertial forces ($F=ma$) apply a torque about the sulky axles which is added to the torque resulting from the positioning of the center of gravity of the driver behind the axle. Both forces sum to produce a lifting force upon the shafts.

At the same time that this upward, lifting force is applied through the shafts to the harness of the horse, the horse is attempting to lower its body 3 to 5 inches as it reaches out to stretch its hooves farther apart. The upward lift on the shafts opposes the horse's effort to lower itself and stretch. The result is that the hooves of the horse strike the track surface in error and often result in leg injuries, such as bowed tendons.

Another difficulty with conventional equipment is that it restricts the horse's movements because of the manner in which the shafts of the conventional sulky are bound to the conventional harness. The twisting and turning of the horse's body during the race applies twisting and bending forces to the harness and through it to the sulky.

Yet another problem with a conventional sulky is that its seat is so low that the driver's vision is obstructed by the body of the horse.

It is therefore an object of the present invention to minimize the twisting and binding forces applied to the harness by the sulky by providing equipment which will allow the horse increased freedom of movement and reduced restraint.

Another object of the present invention is to reduce the lifting force upon the shafts when the horse accelerates.

It is another object of the present invention to provide a sulky in which the driver sits at a higher level and therefore has improved vision of the other competing horses and the track.

BRIEF SUMMARY OF THE INVENTION

The invention is an improved sulky and harness for attachment to a horse. The sulky has a pair of wheels which are rotatable on axles connected to a support frame. A seat is mounted on the support frame and a pair of shafts extend forward from the frame on opposite sides of the horse. The improvement includes a pair of ball joints, one extending inwardly from each of the shafts for attaching the shafts to the harness. The invention further contemplates positioning of the driver's seat forward of the wheel axles of the sulky so that the center of gravity of the driver is forward of the axles of the sulky wheels and higher than the seat of a conventional sulky.

It is an advantage of the present invention that all twisting forces which are normally applied to the harness by the shafts are eliminated so that only straight pulling forces are transmitted between the harness to the shafts. A horse is free to move and twist within the harness in a natural manner witout being restricted by the sulky. If the horse falls during a race, the sulky is not flipped over as with a conventional sulky. Instead the ball joints just pivot.

Additionally, the driver is positioned higher so that he has a better view of the race. The sulky reduces or eliminates the uplift of the shafts due to the inertia during acceleration and yet the shafts are secured to the harness for pulling the sulky without slippage.

The wheels are preferably secured to forwardly and upwardly extending fork members made of a resilient steel. This curvature provides some spring action reducing shock to the driver.

BRIEF DESCRIPTION OF THE DRAWINGS

FIG. 1 is a view in perspective of a prior art horse, harness, sulky and driver.

FIG. 2 is a view in perspective illustrating the preferred embodiment of the invention.

FIG. 3 is a rear view of the embodiment of FIG. 2.

FIG. 4 is an exploded view of the ball joint, trough member and shaft of the embodimemt of FIG. 2.

DETAILED DESCRIPTION OF THE BEST MODE FOR CARRYING OUT THE INVENTION

Figure 5:
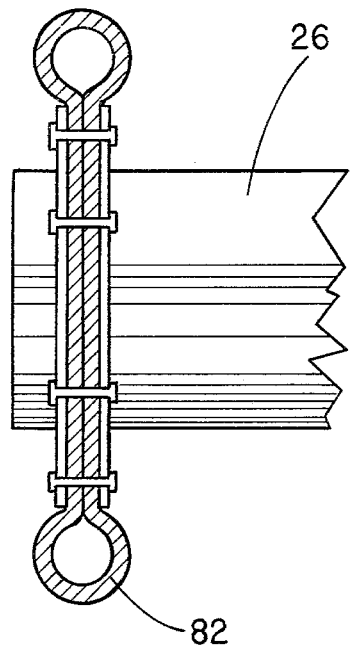
FIG. 5 is a view in vertical section taken through the shaft substantially along the lines 5-5 of FIG. 3.
Figure 6:
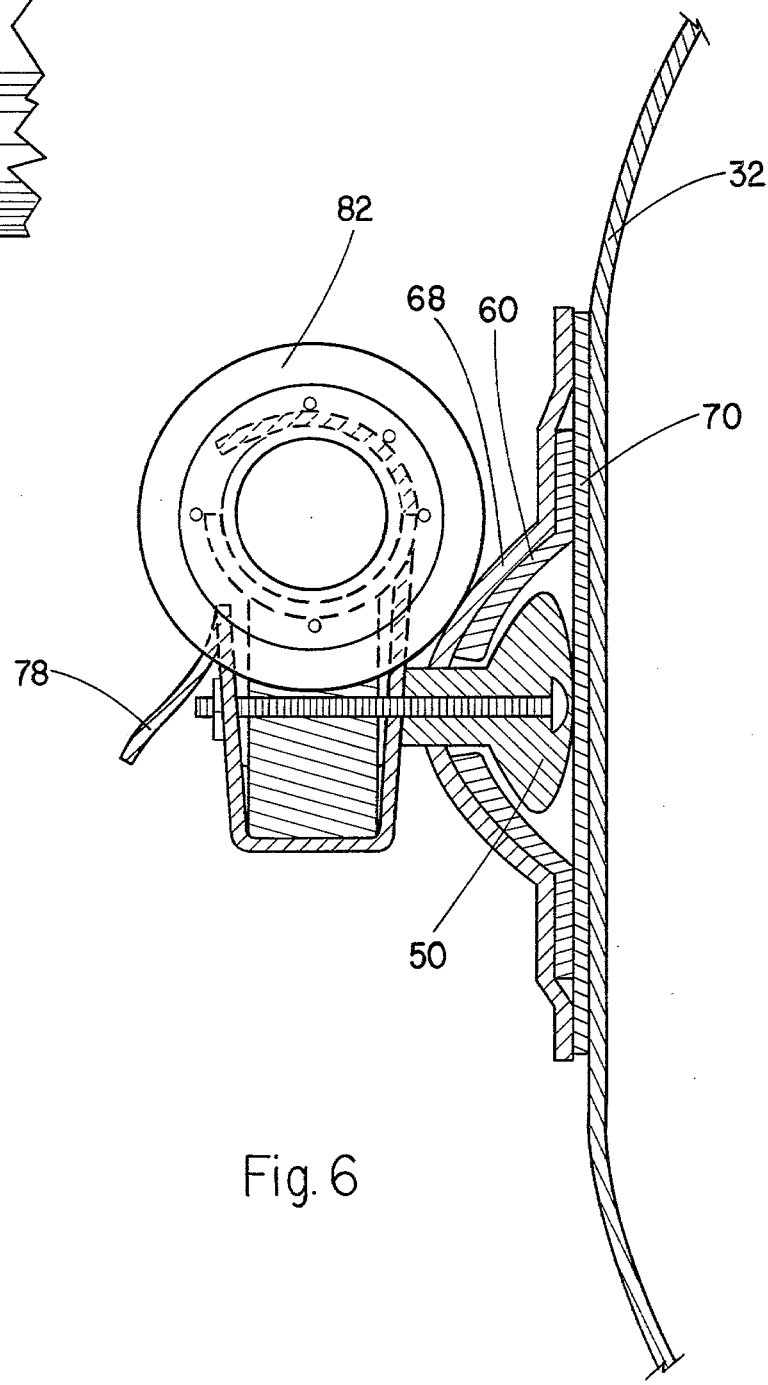
FIG. 6 is an end view of a shaft and a view in vertical section of the assembled ball joint and trough member illustrated in FIG. 4 and is taken substantially along the lines 6-6 of FIG. 2.

FIG. 1 shows a conventional horse, harness, sulky and driver. The sulky has shafts 10 which extend upwardly at a significant angle into attachment with the harness 11. The center of gravity of the driver 12 is rearward of a vertical line 14 which extends upwardly through the wheel axle 16.

In contrast and referring to FIG. 2, the driver of the sulky 18, which embodies the present invention, is positioned forward of a vertical line 20 through the wheel axle 22. Therefore the driver's weight provides a torque about the wheel axles which opposes the inertia forces of the driver and sulky. Additionally, the driver is positioned higher so that he can see over the horse's back. The reins 24 extend directly rearwardly to the driver's hands and the shafts, such as shaft 26, extend nearly horizontally. The shafts are attached to the harness by means of a ball joint such as ball joint 30 which is connected to the shaft 26 and extends inwardly into attachment with the harness 32.

The sulky has two pairs of fork members 40, 42, 44 and 46. Each pair curves downwardly and rearwardly to attachment at opposite sides of the wheels 47 and 48 at the axles 22 and 23.

The fork members are sufficiently long that the driver's head is positioned so that his eyes are on a level significantly above the horse's back. The fork members are made of a resilient steel material so that they not only position the driver forward of the axles 22 and 23 and higher than the conventional driver's position, but also function as springs for the sulky so that track shocks are not fully transmitted to the driver.

Referring now to FIGS. 4–7 which illustrate the detail of the ball joints, the ball joint 30 has a synthetic resin ball portion 50 which is connected by a fastener 52 to a trough member 56. The preferred fastener is a screw having its round head 54 molded into the interior of the ball 50. The trough member 56 is formed with an upwardly opening trough 58 for receipt of the forward end of the shaft, such as the shaft 26.

The socket portion of the ball joint includes a disk 60 made of a relatively rigid material such as a synthetic resin which has a central depression 62 for seating against the ball 50. The disk 60 has a central hole 64 for receipt of a collar 66 formed as a part of the fastener which includes screw 52. The disk 60 is interposed between the ball 50 and the trough member 56.

A leather pocket 68 is interposed between the disk 60 and the trough member 56 and is fastened to the harness 32, preferably by conventional leather stitching to form a pocket which contains the ball 50 and the disk 60. Preferably an additional leather insert 70 also is sewn into the ball joint to avoid friction by the ball directly against the harness 32.

Figure 7:
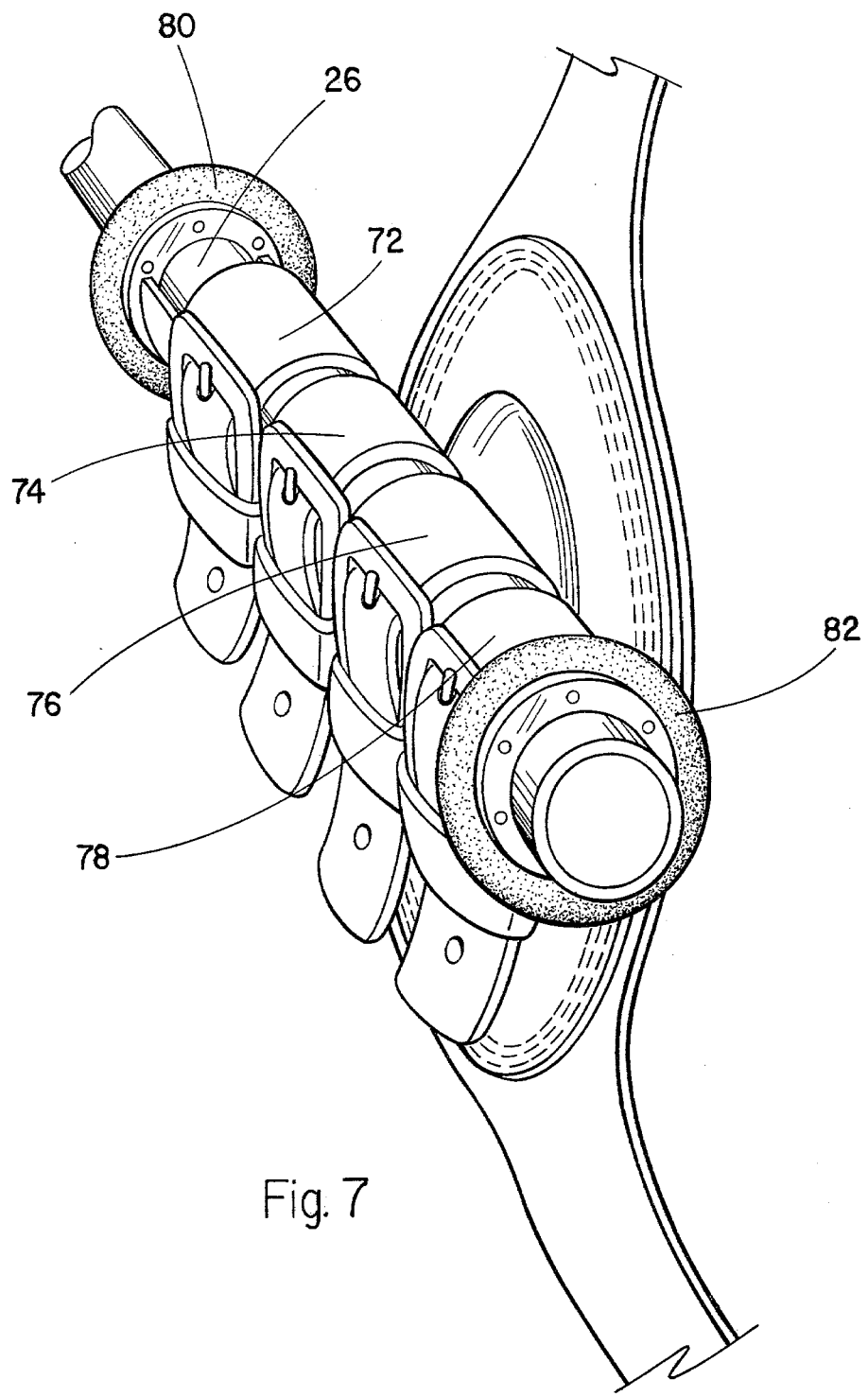
FIG. 7 is an assembled view in perspective of the preferred embodiment illustrated in FIG. 4.

A plurality of leather straps 72, 74, 76 and 78, each having a buckle attached thereto, are fixed to the underside of the trough member 56. As illustrated in FIG. 7, each strap extends upwardly around the shaft and into engagement with its buckle so that the ball joint is secured tightly to the shaft 26.

Each of said shafts, such as the shaft 26, has a pair of spaced annular flanges fixed at opposite ends of the trough member, such as annular flanges 80 and 82, to prevent any longitudinal slippage of the shaft with respect to the ball joint straps 72–78.

From construction details it can be seen that there are essentially no forces applied between the shafts and the harness except for the forward pull of the horse. As the horse runs along the track, torque forces about the axis of the fastener 52 or about any axis through the ball joint are not transmitted through the ball joint to the harness.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. An improved sulky and harness for attachment to a horse, said sulky being of the type having a pair of shafts extending forwardly on opposite sides of the horse, wherein the improvement comprises a pair of ball joints one extending inwardly from each of said shafts into attachment with said harness, each of said ball joints more particularly comprising a trough member connected to the ball portion of said joint by a connector means, said trough member having an end portion of its associated shaft seated in the trough member and a plurality of straps tightly surrounding said shaft and trough member for binding said shaft to said trough member, each of said shafts having a pair of spaced annular flanges attached to the shaft at opposite ends of said trough member to prevent longitudinal slippage of the shaft and wherein the socket portion of said ball joint comprises:
   (a) a disk having a central depression for seating against said ball and interposed between said ball and said trough member, said disk having a central hole for receipt of and larger than said connector means; and
   (b) a leather pocket interposed between said disk and said trough member and fastened to said harness to form a pocket for containing said disk and said ball.

2. An improved sulky and harness for attachment to a horse said sulky being of the type having a pair of wheels rotatable on axles which are connected to a support frame, a seat on the support frame and a pair of shafts extending forwardly on opposite sides of the horse, wherein the improvement comprises:
   (a) a pair of ball joints, one extending inwardly from each of said shafts into attachment with said harness; each of said ball joints including a trough member connected to the ball portion of said joint by a connector means, said trough member having an end portion of its associated shaft seated in the trough member and a plurality of straps tightly surrounding said shaft and trough member for binding said shaft and wherein the socket portion of said ball joint comprises (i) a disk having a central depression for seating against said ball and interposed between said ball and said trough member, said disk having a central hole for receipt of and longer than the connector means and (ii) a leather pocket interposed between said disk and said trough and fastened to said harness to form a pocket for containing said disk and said ball;
   (b) said seat disposed forward of said axles;
   (c) a pair of spaced annular flanges attached to the shaft at opposite ends of said trough member to prevent longitudinal slippage of the shaft; and
   (d) said frame includes a pair of resilient fork members each extending and curving downwardly and rearwardly on opposite sides of a different one of said wheels into attachment with said axles, said fork members being sufficiently long to position the driver's head higher than the horse's back.

* * * * *